No. 849,085. PATENTED APR. 2, 1907.
E. ROSENBERG.
DYNAMO ELECTRIC MACHINE.
APPLICATION FILED AUG. 1, 1904.

WITNESSES:
George A. Thornton.
Helen Oxford

INVENTOR:
Emanuel Rosenberg,
By Albert K. Davis
Att'y.

UNITED STATES PATENT OFFICE.

EMANUEL ROSENBERG, OF BERLIN, GERMANY, ASSIGNOR TO GENERAL ELECTRIC COMPANY, A CORPORATION OF NEW YORK.

DYNAMO-ELECTRIC MACHINE.

No. 849,085.  Specification of Letters Patent.  Patented April 2, 1907.

Application filed August 1, 1904. Serial No. 219,022.

*To all whom it may concern:*

Be it known that I, EMANUEL ROSENBERG, a subject of the Emperor of Austria, residing at Berlin, Germany, have invented certain new and useful Improvements in Dynamo-Electric Machines, of which the following is a specification.

In those dynamo-electric machines in which current is fed thereby to a multiple-conductor system—such, for example, as a three-wire system—it is common to cause the series winding to be traversed by the currents of the outside mains of the system. For this purpose a divided series winding is provided, one portion of which is in series with one outside main and the other in series with the other outside main. This construction is open to certain disadvantages. Thus, for example, if it be desired to operate the machine in multiple with an ordinary compound-wound machine it is necessary in order to make the proper connection of the equalizing conductors by which the said windings are placed in parallel circuit to connect the series windings of both machines to the same outside conductor of the system.

My present invention makes it possible to leave the main or series windings unchanged in one of the outside leads and to secure at the same time the proper regulation to take care of unbalanced loads on the two sides of the system. In accordance with my invention I connect the main series winding on the machine in one only of the outside leads and in addition provide a supplementary winding in series with the neutral conductor of the system. This supplementary winding, if it is desired to obtain the same compounding effect as by the use of two series windings, is provided with half the number of turns of the main winding and is put in circuit so as to magnetize in the same direction as this winding, assuming the winding in each case to be traversed by currents flowing in the same direction relatively to the machine. The cross-section is chosen in accordance with the current which is expected to flow at times in the neutral conductor.

The novel features which are characteristic of my invention I have pointed out with particularity in the appended claims. The invention itself, however, will be better understood by reference to the following description, taken in connection with the accompanying drawings, in which—

Figure 1:
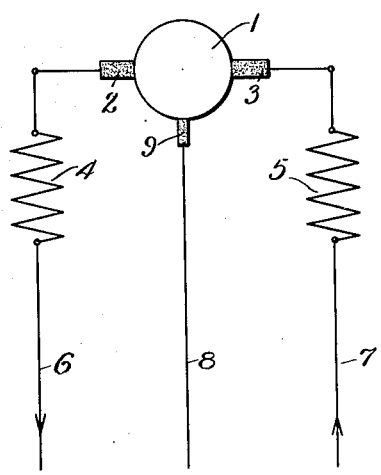
Figure 2:
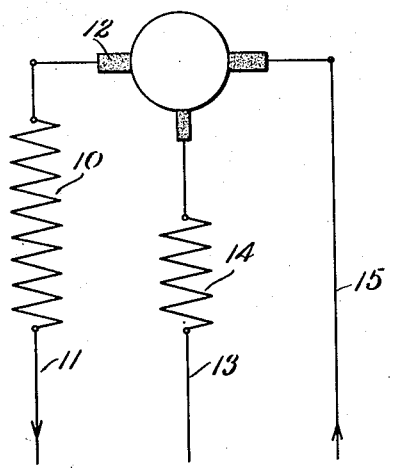

Figure 1 is a diagrammatic representation of a dynamo-electric machine of a type to which my invention is applicable, while Fig. 2 shows my invention as applied to such a machine.

The machines to which my invention is applicable may be of various forms and types so long as they are characterized by connection to a multiple-conductor system and require for their proper operation the use of regulating or compound windings. Fig. 1 is intended as illustrative of a machine of this character. The armature and commutator of the machine are indicated at 1. The main brushes bearing upon the commutator are shown at 2 and 3 and are connected, respectively, to series or compound windings 4 and 5. These windings are connected to the outside mains 6 and 7 of a three-wire distribution system. The neutral conductor 8 of the system is connected to some point of neutral potential with respect to the generator or machine 1. In the present instance this neutral point is provided by means of a third or auxiliary brush 9, located on the commutator midway between the brushes 2 and 3. Any other well-known way, however, of obtaining a neutral for connection to the conductor 8 may be employed without departing from my invention.

The splitting up of the compounding winding into two series coils 4 and 5, as shown in Fig. 1, is at times inconvenient for reasons above mentioned. To overcome this objection and at the same time produce the same regulating action in the machines, I have provided an organization as shown in Fig. 2. In this figure a single series winding 10 having the same total number of turns as the individual windings 4 5 is provided and is connected in one of the outside leads 11 of the machine corresponding to the lead 6 in Fig. 1. This winding is connected to the brush 12, corresponding to the brush 2 in Fig. 2. In series with the neutral conductor 13, which corresponds to conductor 8 in Fig. 1, is connected a coil 14, having half the number of turns of the coil 10. The remaining or outside conductor 15 of the system is left without a regulating-winding.

The organization shown in Fig. 2 has the same regulating action as that shown in Fig. 1 and without the disadvantages present where the regulating-winding in the outside mains is split up as in this latter figure. In Fig. 1 the ampere-turns where $\frac{N}{2}$ is the number of turns of each winding and $C_1$ and $C_2$ the currents are $$\frac{NC_1}{2} + \frac{NC_2}{2}.$$

In Fig. 2 the equation is $$NC_1 + \frac{N}{2}(C_2 - C_1) = \frac{NC_1}{2} + \frac{NC_2}{2}$$

and is thus the same as for Fig. 1.

It will be evident that when the two sides of the three-wire system are equally loaded there will be no current flowing in the winding 14, while when a difference of load occurs this winding will be traversed by a current equal in value to the difference between the currents in the two outside mains 11 and 15. In other words, the winding 14 is traversed by current which is the algebraic sum of the currents in the outside mains.

What I claim as new, and desire to secure by Letters Patent of the United States, is—

1. The combination of a three-wire dynamo-electric machine having a main winding connected to one of the outside mains of the system, and an auxiliary winding traversed by current flowing in the neutral conductor of the system.

2. In a dynamo-electric machine connected to a three-wire system, a regulating-winding connected to one of the outside conductors of said system, and an auxiliary winding of half the number of turns connected to the neutral conductor of the system.

3. A dynamo-electric machine, a multiple conductor system connected thereto, a winding on said machine connected to one of the outside conductors of said system, and an auxiliary winding on said machine connected to an intermediate conductor of said system.

In witness whereof I have hereunto set my hand this 18th day of July, 1904.

EMANUEL ROSENBERG.

Witnesses:
HENRY HASPER,
MAX HANDKE.